(12) United States Patent
Kim et al.

(10) Patent No.: US 11,777,372 B1
(45) Date of Patent: Oct. 3, 2023

(54) PORTABLE POWER GENERATING SYSTEM USES ROTATING TABLE

(71) Applicant: K-TECHNOLOGY USA, INC., Los Angeles, CA (US)

(72) Inventors: Ki Il Kim, Los Angeles, CA (US); Young Kim, Los Angeles, CA (US); Paul Kim, Beverly Hills, CA (US); Sarah Duncanson, Los Angeles, CA (US)

(73) Assignee: K-TECHNOLOGY USA, INC., Los Angeles, CA (US)

( * ) Notice: Subject to any disclaimer, the term of this patent is extended or adjusted under 35 U.S.C. 154(b) by 0 days.

(21) Appl. No.: 18/299,211

(22) Filed: Apr. 12, 2023

Related U.S. Application Data

(63) Continuation-in-part of application No. 18/120,593, filed on Mar. 13, 2023, and a continuation of application No. 17/901,735, filed on Sep. 1, 2022, now Pat. No. 11,606,003.

(51) Int. Cl.
*H02K 7/18* (2006.01)
*H02K 7/116* (2006.01)
*H02K 7/08* (2006.01)

(52) U.S. Cl.
CPC ............ *H02K 7/183* (2013.01); *H02K 7/08* (2013.01); *H02K 7/116* (2013.01)

(58) Field of Classification Search
CPC .......... H02K 7/183; H02K 7/08; H02K 7/116
USPC .................................................... 290/44, 55
See application file for complete search history.

(56) References Cited

U.S. PATENT DOCUMENTS

| | | | |
|---|---|---|---|
| 8,080,895 B1 | 12/2011 | Williams et al. | |
| 8,872,368 B1 * | 10/2014 | Kim ..................... | B61D 43/00 290/3 |
| 9,160,222 B1 * | 10/2015 | Kim ..................... | H02K 47/00 |
| 2011/0133453 A1 | 6/2011 | Merswolke et al. | |
| 2011/0156400 A1 | 6/2011 | Lowe | |
| 2012/0308387 A1 | 12/2012 | Himmelmann et al. | |
| 2013/0292946 A1 | 11/2013 | Himmelmann | |
| 2013/0343889 A1 | 12/2013 | Himmelmann et al. | |
| 2015/0108757 A1 | 4/2015 | Farr | |
| 2019/0341822 A1 | 11/2019 | Kim et al. | |

FOREIGN PATENT DOCUMENTS

| | | |
|---|---|---|
| KR | 20100049721 A | 5/2010 |
| WO | 2014023102 A1 | 2/2014 |

* cited by examiner

*Primary Examiner* — Charles Reid, Jr.
(74) *Attorney, Agent, or Firm* — NKL LAW; Jae Youn Kim

(57) ABSTRACT

Provided is a renewable power generating system including a motor and one or more generators. Each of the motor and the generators comprises a front extended shaft and a rear extended shaft, a first flywheel is installed at the end of the rear extended shaft, and a second flywheel is installed at the end of the front extended shaft. Also, a third flywheel is detachably connected to the second flywheel, and a turbine installed on the third flywheel, and the turbine comprises multiple arms. The first flywheel, the second flywheel and the third flywheel rotates together when the motor rotates, and the system can produce an electric power when rotating.

20 Claims, 8 Drawing Sheets

PORTABLE POWER GENERATING SYSTEM USES ROTATING TABLE

CROSS-REFERENCE TO RELATED APPLICATIONS

This application claims priority from U.S. patent application Ser. No. 18/120,593, filed on Mar. 13, 2023, which is a continuation application of U.S. patent application Ser. No. 17/901,735, filed on Sep. 1, 2022, the entire contents of which are hereby incorporated by reference.

BACKGROUND OF THE INVENTION

One or more embodiments of the present invention relate to an apparatus with at least one power generator rotating on a large gear table driven by an electric motor.

SUMMARY OF THE INVENTION

According to an aspect of the present invention, an apparatus with at least one power generator is provided. The apparatus has a motor and at least one generator. Each of the motor and the at least one generator comprises a front extended shaft and a rear extended shaft, a first flywheel is installed at the end of the rear extended shaft, and a second flywheel is installed at the end of the front extended shaft. Also, a third flywheel is detachably connected to the second flywheel, and a turbine installed on the third flywheel, and the turbine comprises a plurality of arms. According to an exemplary embodiment, the first flywheel, the second flywheel and the third flywheel are configured to rotate together when the motor rotates.

According to an exemplary embodiment, when the motor rotates, the second flywheel of the motor rotates the third flywheel, the third flywheel rotates the second flywheel of the generator, the third flywheel further rotates the turbine installed on the third flywheel, and the plurality of arms of the turbine rotate together with the turbine.

According to an exemplary embodiment, a weight is attached to the end of each of the arms.

According to an exemplary embodiment, the weight comprises a steel weight, a magnet or a rubber roller.

According to an exemplary embodiment, the weight is a magnet or a roller, and the weight passes on the first flywheel pushing with a predetermined amount of a force such that a centrifugal force to the third flywheel increases.

According to an exemplary embodiment, the first flywheel includes magnets so that the magnets of the first flywheel and the plurality of arms push each other.

According to an exemplary embodiment, the heights of the extended turbine and the first flywheel match each other.

According to an exemplary embodiment, the second flywheel includes magnets, and the third flywheel is made of a steel so that the second flywheel and the third flywheel are connected by a magnetic force.

According to an exemplary embodiment, the first flywheel is a rear wheel, the second flywheel is a pinion gear, and the third flywheel is a bevel gear.

According to an exemplary embodiment, a radius of the first flywheel is larger than a radius of the second flywheel, and a radius of the third flywheel is larger than the radius of the first flywheel.

According to an exemplary embodiment, a thrust bearing or a magnet bearing is further installed at the third flywheel.

According to an exemplary embodiment, an edge of the third flywheel is thicker than an inside plate area of the third flywheel.

According to an exemplary embodiment, a handle is attached to the first flywheel.

According to an exemplary embodiment, at least one magnet is provided below the first flywheel.

According to an exemplary embodiment, the second flywheel is provided over or under the third flywheel.

According to an exemplary embodiment, the weight is a synthetic rubber roller contacting the first flywheel, such that when the arms rotate, a friction occurs between the synthetic rubber roller and the first flywheel.

According to an exemplary embodiment, the second flywheel is a synthetic rubber wheel, and the weight is a synthetic rubber roller.

According to an exemplary embodiment, the ends of the arms are connected via a circular bicycle wheel.

According to an exemplary embodiment, the motor and the at least one generator are capable to rotate bidirectionally.

According to an exemplary embodiment, at least one wind blade is attached to the arms.

BRIEF DESCRIPTION OF THE DRAWINGS

These and other aspects will become apparent and more readily appreciated from the following description of the embodiments, taken in conjunction with the accompanying drawings of which.

DETAILED DESCRIPTION

Figure 1:
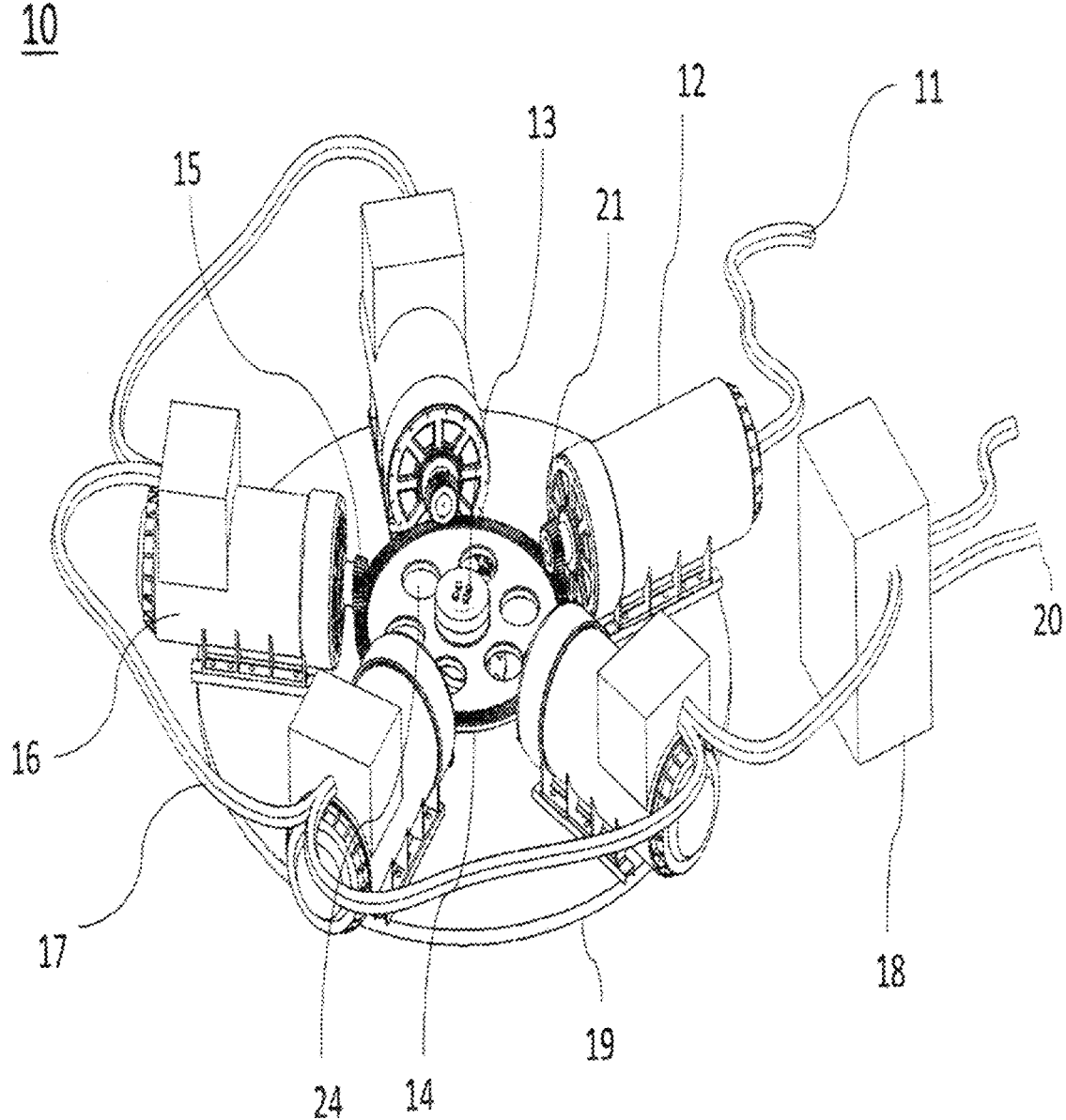
FIG. 1 is a perspective view of an electric power generating system according to an exemplary embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the invention.

The terms "comprises" and/or "comprising" are used to specify the presence of stated elements, steps, operations, and/or components, but do not preclude the presence or addition of one or more other elements, steps, operations, and/or components. The terms "first", "second, and the like may be used to describe various elements, but do not limit the elements. Such terms are only used to classify one element from another.

These and/or other aspects will become apparent and more readily appreciated from the following description of embodiments of the present invention, taken in conjunction with the accompanying drawing.

According to an aspect of the present invention and referring to FIG. 1, an apparatus (10) is provided which has a base (19); an electric motor (12) fixed on the base (19); a circular rotating table (14) located at a center of the base (19) and rotated by the electric motor (12); and at least one power generator (16) fixed on the base (19) and driven by the circular rotating table (14), thereby generating electric power.

The electric motor (12) includes a shaft (21) having a first plurality of gear teeth to engage a second plurality of gear teeth located on the circumferential edge of the circular rotating table (14) so as to rotate the circular rotating table (14). In a preferred embodiment, the electric motor (12) may be capable of providing 100 hp with a RPM of 1,800. Also, the power generator (16) may have the capacity of generating 50 kw to 400 kW. The generator or motor may be adapted of the MGM Compro® which is 50% lighter than other conventional generator or a motor as well as greater torque, has already been used in drone industries. Furthermore, this invention may be adapted nano wires of graphene wires, carbon nano tube (CNT) wires or composite wires of graphene/CNT/cooper wires for winding new generators made by Boronite Inc®.

Figure 2:
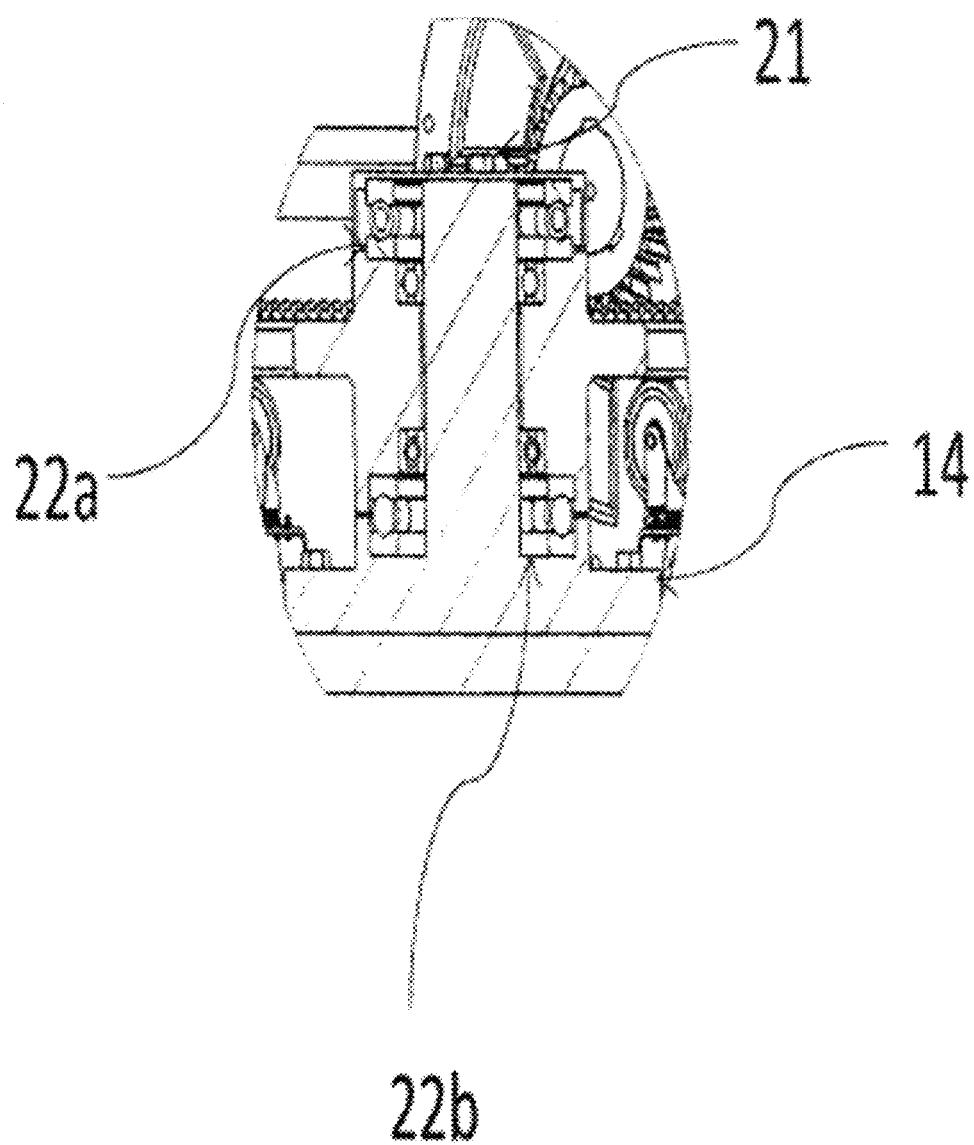
FIG. 2 is a sectional view of the circular rotating table of the apparatus of FIG. 1.

Further, the apparatus (10) has a center post (13) configured to hold the circular rotating table (14), wherein the center post (13) and the circular rotating table (14) are connected with each other through at least one thrust bearing (22a and 22b). In a preferred embodiment, the center post (13) and the circular rotating table are connected with each other through an upper thrust bearing (22a) and a lower thrust bearing (22b) located between the circular rotating table (14) and the center post (13) as shown in FIG. 2.

Further, the circular rotating table (14) includes at least one opening (24) located between the post (13) and the circumferential edge of the circular rotating table (14). In a preferred embodiment, the circular rotating table (14) may have a diameter of 6.5 ft, and there are six openings (24) in a circular shape in the circular rotating table (14). However, the shape of the opening (24) may be modified such as oval, rectangular, triangle, and the like to reduce the weight of the circular rotating table (14) and to increase centrifugal force of the circular rotating table (14). Further, the at least one power generator (16) has a rotating shaft (15) with a third plurality of gear teeth configured to engage the second plurality of gear teeth of the circular rotating table (14). In a preferred embodiment, the apparatus may have four power generators (16) located on the base (19) with an equal distance with one another, and all of the power generators (16) are axially located with respect to the circular rotating table (14) so that the front part with the shaft (15) faces the center post (13) of the power generating system (10).

According to an embodiment of the present invention, the gear ratio between the first plurality of gear teeth and the second plurality of gear teeth is same as the gear ratio between the third plurality of gear teeth and the second plurality of gear teeth, thereby rotating the at least one power generator (16) at the same RPM as the electric motor (12). The electric motor (12) is connected to the AC power or DC power (11) to be driven by the electric power. In a preferred embodiment, the electric motor (12) may rotate at the speed of 800 rpm to 1,800 RPM so that the power generator (16) of also rotate at the same speed of 800 rpm to 1,800 RPM to generate the equal power by each generator (16).

According to an embodiment of the present invention, the four generators (16) are connected with each other through each one of the electric wires (17).

According to an embodiment of the present invention, one of the at least one power generator (16) is connected to a power transformer (18) to supply the generated power to a battery/grid (20) or the electric motor (12).

Figure 3:
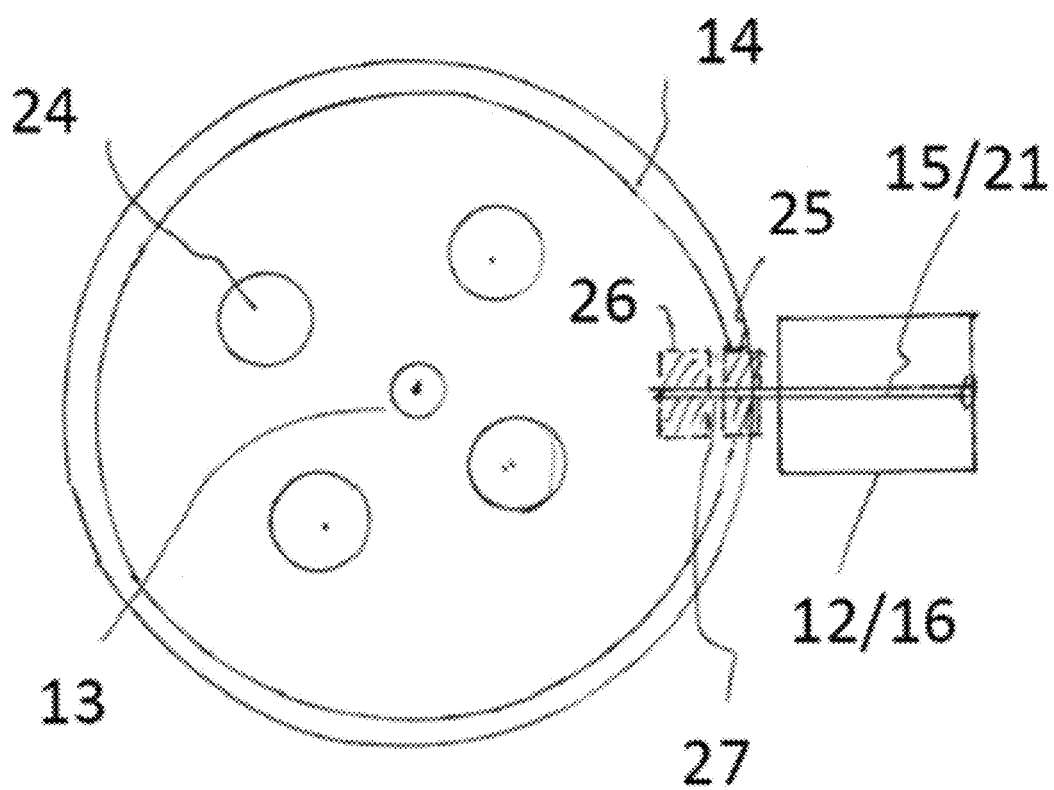
FIG. 3 is a Sectional view of generator or motor of an extended shaft attached pinion gear and magnet roller.
Figure 4:
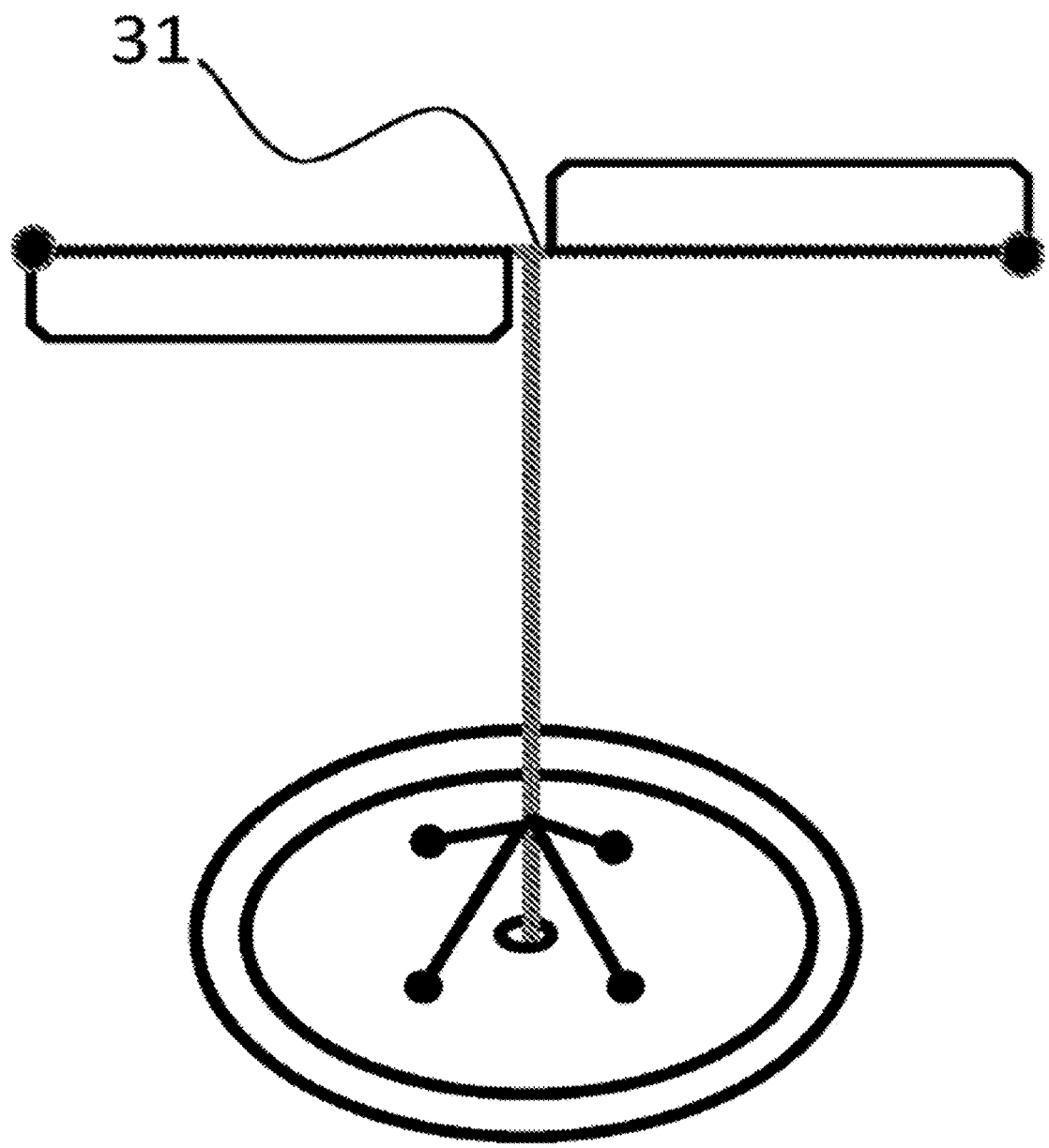
FIG. 4 is a sectional view of the circular rotating table connected to a wind turbine. The features and advantages of the present invention will become more apparent from the detailed description set forth below when taken in conjunction with the drawings in which like reference numbers indicate identical or functionally similar elements.

FIG. 3. shows the present invention of magnet rollers (26) and pinion gear (25) attached to an extended shaft (27) of the generator or a motor. The magnet roller touches and pushing the rotating table with 50 to 100 lbs. force when rotating table, and that force increasing centripetal force greatly. The generator or motor (12/16), shaft (15/21), circular rotating table (14), hole (24), center post (13) are shown in the FIG. 1.

The present invention is to provide an emergency system is connectable a vertical wind (31) turbine to the center post (13) and rotating together with the table in case of an electric motor stopped (not shown drawing), the freeway wind power is always powerful, so this invention would be useful for the US government's public project of freeway electric vehicle (EV) charging system.

Figure 5:
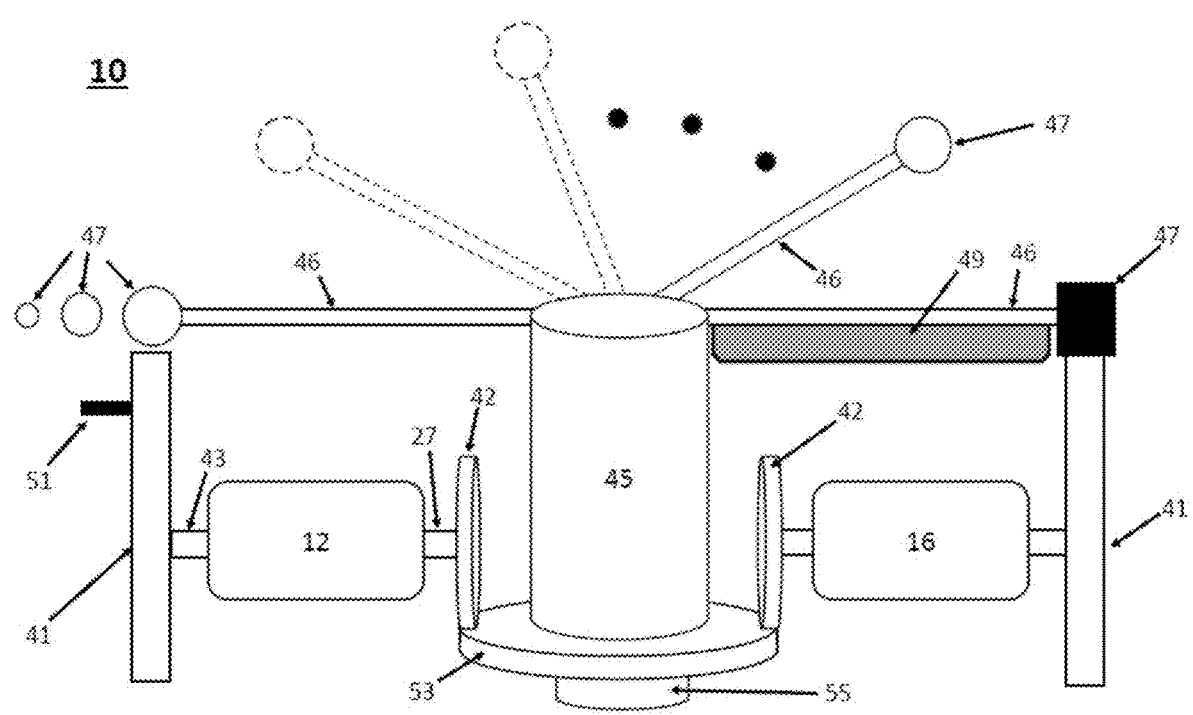
FIG. 5 is a view of an electric power generating system with extended turbine arms and flywheels according to another exemplary embodiment.

Turning now to exemplary FIG. 5, FIG. 5 shows another exemplary embodiment of an electric power generating system (10) with extended turbine arms and flywheels. According to an exemplary embodiment, each of the electric motor (12) or the generators (16) may have dual extended shafts which may include a front extended shaft (27) and a rear extended shaft (43). In an exemplary embodiment, each of the electric motor (12) and the generators (16) may have the first flywheel (41) and the second flywheel (42). The first flywheel (41) is provided at the rear extended shaft (43), and the second flywheel (42) is provided at the front extended shaft (27). Thus, the generators (16) or motor (12) has extended shafts on both sides, and the first flywheel (41) and the second flywheel (42) are attached thereon. Further, according to an exemplary embodiment, the third flywheel (53) may be provided being connected to the second flywheel. In an exemplary embodiment, an extended turbine (45) and turbine arms (46) may be provided on the third flywheel (53). According to an exemplary embodiment, all of the first, second and third flywheels (41, 42 and 53) are collaborated with each other and rotating together at the same time when the motor (12) rotates, and then the generator (16) produces renewable electric energy.

Figure 6:
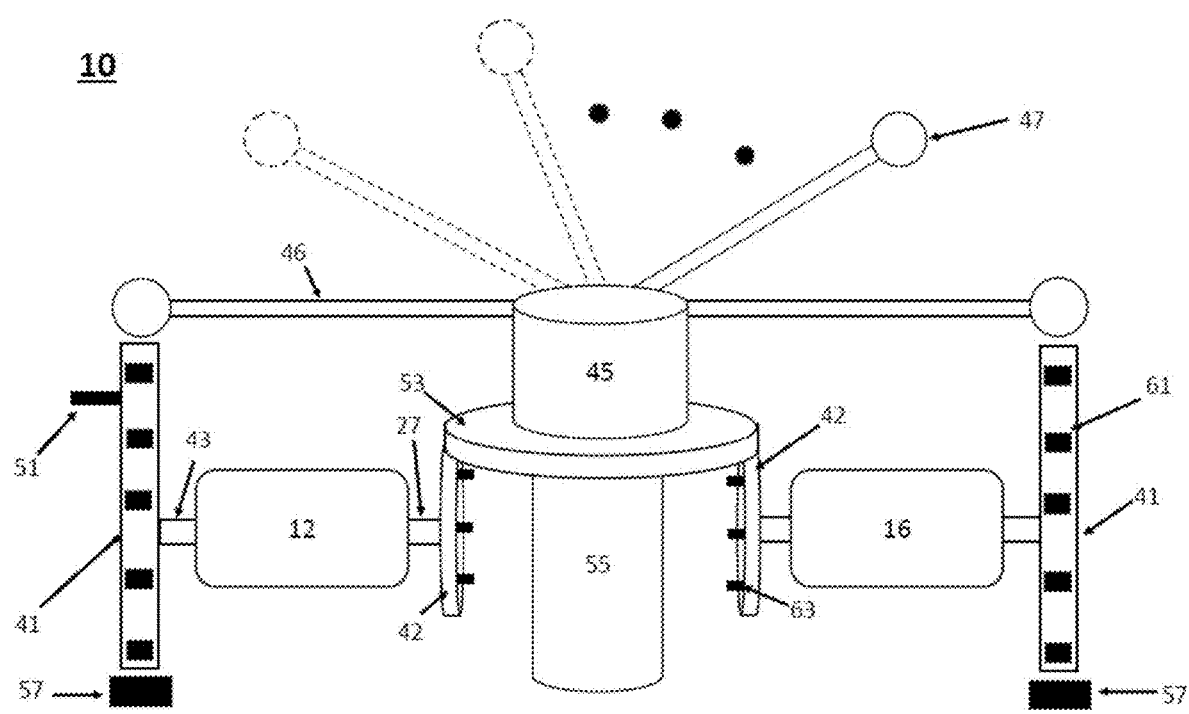
FIG. 6 is a view of an electric power generating system with extended turbine arms and flywheels according to another exemplary embodiment.

Referring still to FIG. 5, for example, when the motor (12) rotates, the second flywheel (42) of the motor (12) may rotate the third flywheel (53), then the third flywheel (53) may rotate the second flywheel (42) of the generator (16). The third flywheel (53) may also rotate the extended turbine (45) installed on the third flywheel (53). The turbine arms (46) of the extended turbine (45) may rotate together with the extended turbine (45). In an exemplary embodiment, a weight (47) may be attached to the end of each turbine arm (46). Referring to FIG. 6, the weight (47) may be a steel, magnet or roller of unlimited shapes. Thus, according to an exemplary embodiment, when the extended turbine (45) rotates, the turbine arms (46) may also rotate together with the extended turbine (45), and the weight (47) may add a centrifugal force to the third flywheel (53). Also, if the weight (47) is the magnet or roller, it may pass on the first flywheel (41) pushing with a certain amount of force to increase a centrifugal force to the third flywheel (53). Referring to FIG. 6, when the weight (47) is the roller, the roller may be made of a synthetic rubber contacting the first flywheel (41), and thus, when the turbine arms (46) rotate, there may be a fraction between the roller and the first flywheel (41). Also, in an exemplary embodiment, the second flywheel (42) may be a synthetic rubber wheel when the weight is a synthetic rubber roller.

Also, referring to FIG. 6, in an embodiment, the first flywheel (41) may also include magnets (61) so that the magnets of the first flywheel (41) and the turbine arms (46) may push each other. Also, in that regard, the heights of the extended turbine (45) and the first flywheel (41) may be adjusted to be properly matched. According to an exemplary embodiment, the second flywheel (42) may also include magnets (63), and the third flywheel (53) may be a steel so that the second flywheel (42) and the third flywheel (53) may be connected by a magnetic force. The second flywheel (42) or the first flywheel (41) may include the magnets optionally when needed for increasing centripetal force. The magnets may have, for example, over 100-1000 lbs. of pulling or pushing magnetic forces.

Also, in another exemplary embodiment, the first flywheel (41) may be a large rear wheel, the second flywheel (42) may be a pinion gear, and the third flywheel (53) may be a bevel gear. Further, exemplary specifications and calculated centripetal forces for the first, second and third flywheels (41, 42 and 53) are as below:

|  | Mass (lbs.) | Radius | RPM | Centripetal Force (KN) |
| --- | --- | --- | --- | --- |
| first flywheel (41) | 1200 | 2 feet | 1800 | 11,789 |
| second flywheel (42) | 1000 | 30 inch | 1800 | 12,281 |
| third flywheel (53) | 3000 | 6 feet | 1000 | 27,290 |

The third flywheel (53) may utilize a thrust bearing or a magnet bearing (55) for better rotations. Also, the edge of third flywheel (53) may be thicker than inside plate area for increasing a centripetal force.

According to an exemplary embodiment, eight turbine arms (46) may be provided on the extended turbine (45), and the extended turbine (45) may have a cylindrical shape, but the number and the shape are not limited. Referring to FIG. 5, the turbine arms (46) may include fan blades (49). Further, in an exemplary embodiment, a handle (51) may be attached to the first flywheel (41) so that the system may be started with few turns of the handle (51). Also, referring to FIG. 6, in another exemplary embodiment, additional magnet (57) may be provided on the ground below the first flywheel (41) so that the magnets (57) of the ground and the first flywheel (41) may push each other. Referring still to FIG. 6, the second flywheel (42) may be provided under the third flywheel (53). Also, in an exemplary embodiment, the system may be installed on a truck or trailers.

Figure 7:
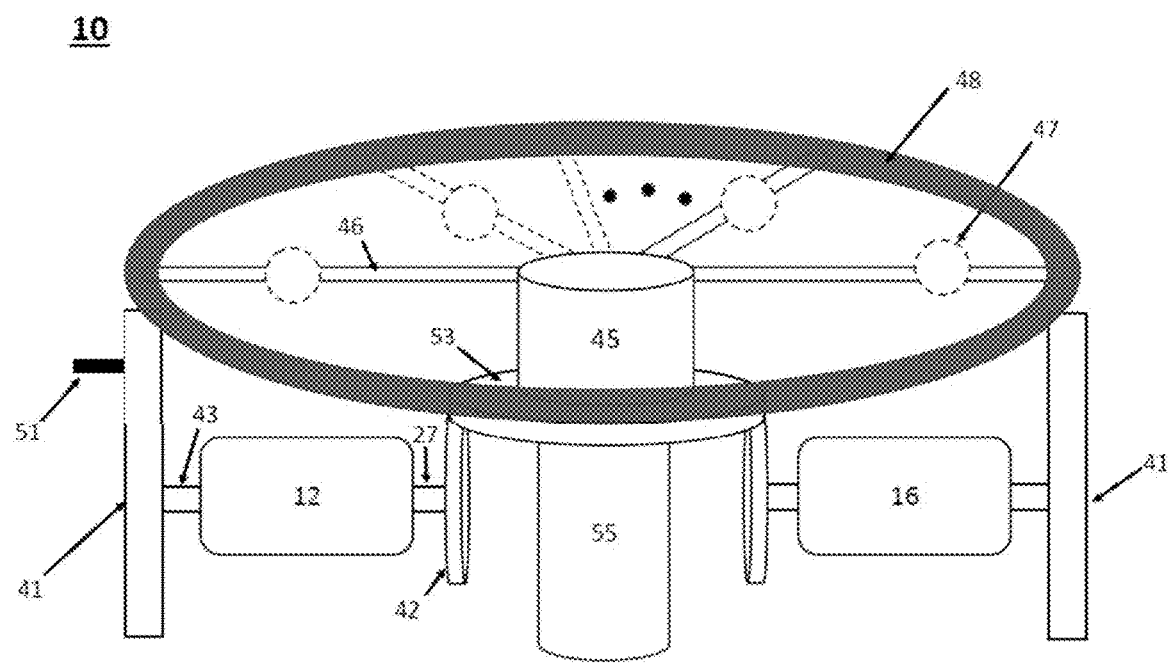
FIG. 7 is a view of an electric power generating system with extended turbine arms and flywheels according to another exemplary embodiment.

Referring now to FIG. 7, in another exemplary embodiment, the turbine arms (46) may be connected each other via a circular wheel (48). The circular wheel (48) may be provided at the ends of the turbine arms (46) instead of the weight (47), and the width of the circular wheel (48) may be two inch or more. In an exemplary embodiment, the circular wheel (48) may be made of or coated with a synthetic rubber. Also, when the circular wheel (48) provided instead of the weight (47), the second fly wheel may also be made of or coated with a synthetic rubber. Further, the weight (47) may optionally be added to the arms (46) in addition to the circular wheel (48).

Figure 8:
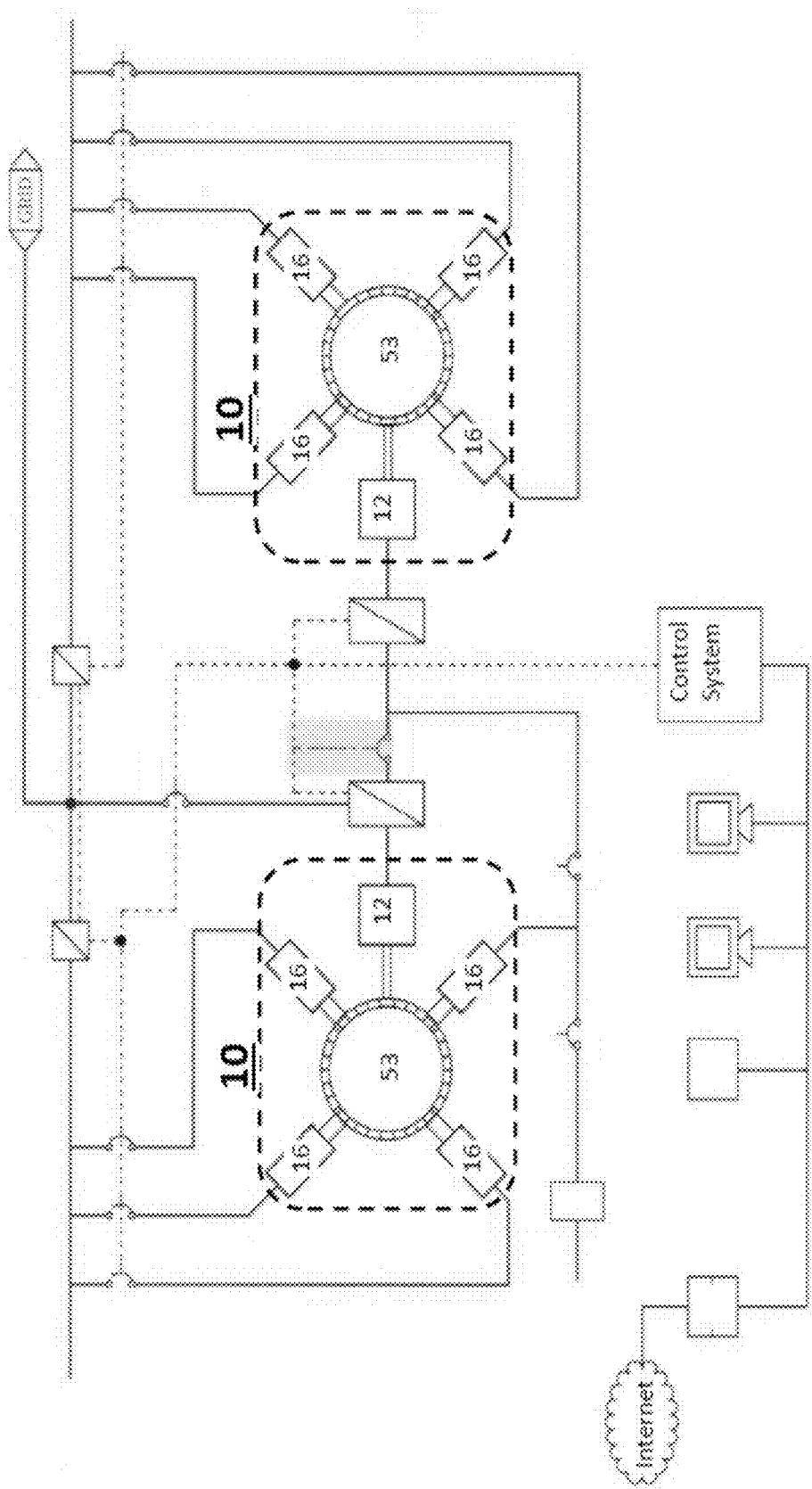
FIG. 8 is a view of two electric power generating system connected and controlling by one central monitoring system and Internet according to another exemplary embodiment.

Further, referring now to FIG. 8, two or more systems may be connected and controlled by one central monitoring system and/or Internet for power, voltages, frequency, speed, and any other factors. At least one generator (16) with at least one motor (12) may be installed in each system. Also, the motor (12) may be DC or AC motor.

Another aspect of the present invention is to provide a method for generating electric power by using the above apparatus with power generators as described.

It should be understood that the exemplary embodiments described therein should be considered in a descriptive sense only and not for purposes of limitation. Descriptions of features or aspects within each embodiment should typically be considered as available for other similar features or aspects in other embodiments.

PARTS LIST generator system (10)
circular rotating table (14)
generators (16)
motor (12)
shaft (21)
an extended shaft (27)
magnet rollers (26) and pinion gear (25)
vertical wind (31) turbine
first flywheel (41)
second flywheel (42)
third flywheel (53)
front extended shaft (27)
rear extended shaft (43)
extended turbine (45)
turbine arms (46)
starting handle (51)
weight (47)
circular wheel (48)
fan blades (49)
thrust bearing or magnet bearing (55)
magnets of the ground (57)
magnets (61) of the first flywheel (41)
magnets (63) of the second flywheel (42)

The invention claimed is:

1. A renewable power generating system comprising:
    a motor and at least one generator, wherein each of the motor and the at least one generator comprises a front extended shaft and a rear extended shaft, a first flywheel is installed at the end of the rear extended shaft, and a second flywheel is installed at the end of the front extended shaft;
    a third flywheel detachably connected to the second flywheel; and
    a turbine installed on the third flywheel, and the turbine comprises a plurality of arms,
    wherein the first flywheel, the second flywheel and the third flywheel are configured to rotate together when the motor rotates.

2. The renewable power generating system of claim 1, wherein when the motor rotates, the second flywheel of the motor rotates the third flywheel, the third flywheel rotates the second flywheel of the at least one generator, the third flywheel further rotates the turbine installed on the third flywheel, and the plurality of arms of the turbine rotate together with the turbine.

3. The renewable power generating system of claim 1, wherein a weight is attached to the end of each of the arms.

4. The renewable power generating system of claim 3, wherein the weight comprises a steel weight, a magnet or a rubber roller.

5. The renewable power generating system of claim 3, wherein the weight is a magnet or a roller, and the weight passes on the first flywheel pushing with a predetermined amount of a force such that a centrifugal force to the third flywheel increases.

6. The renewable power generating system of claim 5, wherein the first flywheel includes magnets so that the magnets of the first flywheel and the plurality of arms push each other.

7. The renewable power generating system of claim 1, wherein the heights of the turbine and the first flywheel match each other.

8. The renewable power generating system of claim 1, wherein the second flywheel includes magnets, and the third flywheel is made of a steel so that the second flywheel and the third flywheel are connected by a magnetic force.

9. The renewable power generating system of claim 1, wherein the first flywheel is a rear wheel, the second flywheel is a pinion gear, and the third flywheel is a bevel gear.

10. The renewable power generating system of claim 1, wherein a radius of the first flywheel is larger than a radius of the second flywheel, and a radius of the third flywheel is larger than the radius of the first flywheel.

11. The renewable power generating system of claim 1, wherein a thrust bearing or a magnet bearing is further installed at the third flywheel.

12. The renewable power generating system of claim 1, wherein an edge of the third flywheel is thicker than an inside plate area of the third flywheel.

13. The renewable power generating system of claim 1, wherein a handle is attached to the first flywheel.

14. The renewable power generating system of claim 1, wherein at least one magnet is provided below the first flywheel.

15. The renewable power generating system of claim 1, wherein the second flywheel is provided over or under the third flywheel.

16. The renewable power generating system of claim 3, wherein the weight is a synthetic rubber roller contacting the first flywheel, such that when the arms rotate, a friction occurs between the synthetic rubber roller and the first flywheel.

17. The renewable power generating system of claim 3, wherein the second flywheel is a synthetic rubber wheel, and the weight is a synthetic rubber roller.

18. The renewable power generating system of claim 1, wherein the ends of the arms are connected via a circular bicycle wheel.

19. The renewable power generating system of claim 1, wherein the motor and the at least one generator are capable to rotate bidirectionally.

20. The renewable power generating system of claim 1, wherein at least one wind blade is attached to the arms.

\* \* \* \* \*